(12) United States Patent
Matsumoto

(10) Patent No.: US 9,441,159 B2
(45) Date of Patent: Sep. 13, 2016

(54) METHOD FOR PRODUCING COMPOSITION

(71) Applicant: DIC CORPORATION, Tokyo (JP)

(72) Inventor: Takashi Matsumoto, Saitama (JP)

(73) Assignee: DIC CORPORATION, Tokyo (JP)

( * ) Notice: Subject to any disclaimer, the term of this patent is extended or adjusted under 35 U.S.C. 154(b) by 143 days.

(21) Appl. No.: 14/369,574

(22) PCT Filed: Apr. 5, 2013

(86) PCT No.: PCT/JP2013/060452
§ 371 (c)(1),
(2) Date: Jun. 27, 2014

(87) PCT Pub. No.: WO2014/162587
PCT Pub. Date: Oct. 9, 2014

(65) Prior Publication Data
US 2016/0102252 A1    Apr. 14, 2016

(51) Int. Cl.
*C09K 19/04* (2006.01)
*C09K 19/30* (2006.01)
*C09K 19/54* (2006.01)
*C09K 19/20* (2006.01)

(52) U.S. Cl.
CPC ....... *C09K 19/3066* (2013.01); *C09K 19/0403* (2013.01); *C09K 19/20* (2013.01); *C09K 19/3003* (2013.01); *C09K 19/54* (2013.01); *C09K 2019/0466* (2013.01); *C09K 2019/301* (2013.01); *C09K 2019/3004* (2013.01); *C09K 2019/3009* (2013.01); *C09K 2019/3016* (2013.01); *C09K 2219/00* (2013.01)

(58) Field of Classification Search
CPC .............. C09K 19/0403; C09K 19/20; C09K 19/3066; C09K 19/54; C09K 2019/0448; C09K 2019/0466; C09K 2019/301; C09K 2019/3077; C09K 2019/3004; C09K 2019/3066
See application file for complete search history.

(56) References Cited

U.S. PATENT DOCUMENTS

| | | |
|---|---|---|
| 6,444,278 B1 | 9/2002 | Reiffenrath et al. |
| 9,120,883 B2 * | 9/2015 | Kusumoto ......... C09K 19/2007 |
| 2005/0285081 A1 | 12/2005 | Tomi |
| 2007/0012898 A1 | 1/2007 | Saito et al. |
| 2014/0080990 A1 * | 3/2014 | Kusumoto ......... C09K 19/2007 526/313 |
| 2014/0226119 A1 | 8/2014 | Kuriyama et al. |
| 2014/0313468 A1 * | 10/2014 | Fujisawa ............... G02F 1/1416 349/168 |
| 2014/0327862 A1 * | 11/2014 | Hatsusaka .......... C09K 19/0225 349/100 |
| 2015/0197471 A1 * | 7/2015 | Kusumoto ............. C07C 41/40 568/645 |

FOREIGN PATENT DOCUMENTS

| | | |
|---|---|---|
| JP | 58-1774 A | 1/1983 |
| JP | 62-210419 A | 9/1987 |
| JP | 62-210420 A | 9/1987 |
| JP | 64-87685 A | 3/1989 |
| JP | 5-214342 A | 8/1993 |
| JP | 7-225369 A | 8/1995 |
| JP | 10-8057 A | 1/1998 |
| JP | 2006-169472 A | 6/2006 |
| JP | 2006-193707 A | 7/2006 |
| JP | 2007-23095 A | 2/2007 |
| JP | 2007-246534 A | 9/2007 |
| JP | 2008-248061 A | 10/2008 |
| JP | 5170603 B1 | 3/2013 |
| WO | 2013/161096 A1 | 10/2013 |

OTHER PUBLICATIONS

International Search Report dated Jul. 9, 2013 issued in correponding application No. PCT/JP2013/060452.

* cited by examiner

*Primary Examiner* — Shean C Wu
(74) *Attorney, Agent, or Firm* — Westerman, Hattori, Daniels & Adrian, LLP

(57) ABSTRACT

A raw material composition containing a hindered phenol compound having a specified structure and a compound constituting a liquid crystal material is prepared, the raw material composition is brought into contact with a purifying agent after being dissolved in an organic solvent or without the addition of an organic solvent to the raw material composition, and then the purifying agent is removed, and when a composition after the purifying agent is removed does not contain the organic solvent, the composition is provided as a target composition, and when the composition after the purifying agent is removed contains the organic solvent, the organic solvent is distilled off to provide a target composition.

18 Claims, No Drawings

METHOD FOR PRODUCING COMPOSITION

TECHNICAL FIELD

The present invention relates to a method for producing a composition.

BACKGROUND ART

Liquid crystal display devices have become widely used for consumer application to industrial application, such as liquid crystal televisions, cellular phones, personal computers, etc. These products have a relatively long lifetime of several years to several tens years, and liquid crystal materials used in liquid crystal display devices are required to have high stability in order that the display devices normally operate for the lifetime. A typical index for stability of liquid crystal materials is a resistivity value. In order that liquid crystal display devices normally operate, it is necessary for liquid crystal materials used in the display devices to have a sufficiently high resistivity value and to be suppressed from degrading over time.

In order to improve stability of liquid crystal materials, many researches have been conducted. A typical example thereof relates to a method of bringing a liquid crystal material into contact with silica gel or alumina to remove moisture, organic ions, inorganic ions, and the like from the liquid crystal material, thereby enhancing a resistivity value (Patent Literatures 1 and 2).

However, some compounds constituting liquid crystal materials may cause reaction such as dimerization or decomposition by contact with silica gel or the like, resulting in a decrease in purity and a decrease in resistivity value with the decrease in purity. This tendency is particularly high in compounds having an alkenyl group or a polymerizable group in a side chain. Therefore, there is desire for a simple practical method for achieving a high resistivity value without deterioration in compounds constituting liquid crystal materials, but a specific solving method has not yet been reported.

CITATION LIST

Patent Literature

PTL 1: Japanese Unexamined Patent Application Publication No. 62-210420
PTL 2: Japanese Unexamined Patent Application Publication No. 58-1774

SUMMARY OF INVENTION

Technical Problem

The present invention has been achieved in consideration of the above-described situation, and an object of the present invention is to provide a simple practical method for producing a compound or composition constituting a liquid crystal material.

Solution to Problem

As a result of keen research in view of the above-mentioned situation, the inventors found that a simple practical method capable of achieving a high resistivity value without deterioration in a compound constituting a liquid crystal material can be realized by synthesizing the compound, then adding a specified antioxidant to the compound, and performing treatment such as purification, leading to the achievement of the present invention.

That is, the present invention provides a method for producing a composition, the method including preparing a raw material composition containing one or two or more compounds selected from a compound group represented by general formula (I),

[Chem. 1]

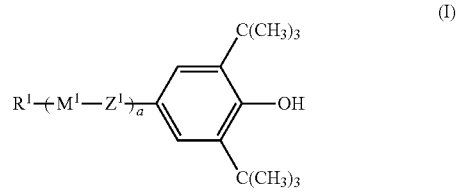

(in the general formula (I), $R^1$ represents a linear alkyl group or branch alkyl group having 1 to 22 carbon atoms, one or two or more —$CH_2$— in the alkyl group may be substituted by —O—, —CH=CH—, —CO—, —OCO—, —COO—, —C≡C—, —$CF_2$O—, or —$OCF_2$— so that oxygen atoms are not directly adjacent to each other, a represents 0, 1, or 2, $M^1$ represents a group selected from the group consisting of (a) a trans-1,4-cyclohexylene group (one —$CH_2$— or two or more nonadjacent —$CH_2$— present in the group may be substituted by —O— or —S—), (b) a 1,4-phenylene group (one —CH= or two or more nonadjacent —CH= present in the group may be substituted by —N=), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chromane-2,6-diyl group, one or two or more hydrogen atoms contained in the group (a), group (b), or group (c) may be each substituted by a fluorine atom, a trifluoromethyl group, a trifluoromethoxy group, or a chlorine atom, and when a represents 2 and a plurality of $M^1$ are present, the plurality of $M^1$ present may be the same or different, $Z^1$ represents a single bond, —$CH_2CH_2$—, —CH=CH—, —C≡C—, —$CH_2O$—, —$OCH_2$—, —$CF_2O$—, —$OCF_2$—, —COO—, or —OCO—, and when a represents 2 and a plurality of $Z^1$ are present, the plurality of $Z^1$ present may be the same or different) and general formula (III),

[Chem. 2]

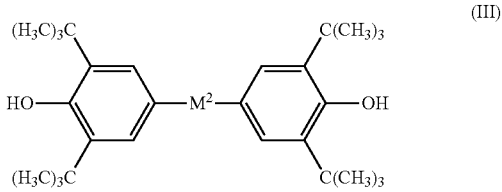

(in the general formula (III), $M^2$ represents an alkylene group having 1 to 15 carbon atoms (one or two or more —$CH_2$— in the alkylene group may be substituted by —O—, —CO—, —COO—, —OCO—, —$CF_2O$—, —OCF$_2$—, —CF$_2$—, —CH═CH—, —C≡C—, a 1,4-phenylene group (one or two or more hydrogen atoms in the 1,4-phenylene group may be substituted by a fluorine atom), or a trans-1,4-cyclohexylene group so that oxygen atoms are not directly adjacent to each other) or a single bond), and the raw material composition further containing one or two or more compounds selected from a compound group represented by general formula (II),

[Chem. 3]

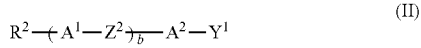
(II)

(in the general formula (II), R$^2$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, b represents 1, 2, 3, or 4, A$^1$ and A$^2$ each independently represent a group selected from the group consisting of (a) a trans-1,4-cyclohexylene group (one —CH$_2$— or two or more nonadjacent —CH$_2$— present in the group may be substituted by —O— or —S—), (b) a 1,4-phenylene group (one —CH═ or two or more nonadjacent —CH═ present in the group may be substituted by —N═), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chromane-2,6-diyl group, one or two or more hydrogen atoms contained in the group (a), group (b), or group (c) may be each substituted by a fluorine atom, a trifluoromethyl group, a trifluoromethoxy group, or a chlorine atom, and when b represents 2, 3, or 4 and a plurality of A$^1$ are present, the plurality of A$^1$ present may be the same or different, Z$^2$ represents a single bond, —CH$_2$CH$_2$—, —CH═CH—, —C≡C—, —CH$_2$O—, —OCH$_2$—, —CF$_2$O—, —OCF$_2$—, —COO—, or —OCO—, and when b represents 2, 3, or 4 and a plurality of Z$^2$ are present, the plurality of Z$^2$ present may be the same or different, and Y$^1$ represents a hydrogen atom, a fluorine atom, a chlorine atom, a trifluoromethyl group, a trifluoromethoxy group, an alkyl group having 1 to 6 carbon atoms, an alkenyl group having 2 to 6 carbon atoms, an alkoxy group having 1 to 6 carbon atoms, or an alkenyloxy group having 2 to 6 carbon atoms);

bringing the raw material composition into contact with a purifying agent after dissolving the raw material composition in an organic solvent or without adding an organic solvent to the raw material composition, and then removing the purifying agent; and when a composition after the purifying agent is removed does not contain the organic solvent, providing the composition as a target composition, and when the composition after the purifying agent is removed contains the organic solvent, distilling off the organic solvent to provide a target composition.

Advantageous Effects of Invention

According to the present invention, a compound or composition constituting a liquid crystal material can be produced by a simple practical method.

DESCRIPTION OF EMBODIMENTS

The present invention provides a method for producing a compound or composition, the method including preparing a raw material composition containing at least one compound which is a hindered phenol having a specified structure, and at least one compound constituting a liquid crystal material, and purifying at least one compound constituting the liquid crystal composition through a series of purification steps starting from the raw material composition.

The series of purification steps preferably include at least a step of bringing the raw material composition (including a composition or mixture further containing another substance added to the raw material composition) into contact with a purifying agent, and then a step of removing the purifying agent.

The raw material composition may be either a homogeneous composition or an inhomogeneous composition, but is preferably a homogeneous composition.

The raw material composition may contain an organic solvent or not contain an organic solvent.

The step of bringing the raw material composition into contact with the purifying agent may be a step of dissolving the raw material composition and bringing the resultant solution into contact with the purifying agent or a step of bringing the raw material composition into contact with the purifying agent without adding an organic solvent to the raw material composition.

When the raw material composition is a solid at room temperature, it is preferred to dissolve the raw material composition in an organic solvent and bring the resultant solution into contact with the purifying agent. When the raw material composition is a liquid crystal at room temperature, it is possible to dissolve the raw material composition in an organic solvent and bring the resultant solution into contact with the purifying agent, but the raw material composition in a liquid crystal state is preferably directly brought into contact with the purifying agent. When the raw material composition is a liquid at room temperature, it is possible to dissolve the raw material composition in an organic solvent and bring the resultant solution into contact with the purifying agent, but the raw material composition in a liquid state is preferably directly brought into contact with the purifying agent.

When a composition after the purifying agent is removed does not contain the organic solvent, the composition is provided as a target composition, and when the composition after the purifying agent is removed contains the organic solvent, the organic solvent is distilled off to provide a target composition.

The raw material composition preferably contains one or two or more compounds selected from the compound group consisting of compounds represented by general formula (I) and compounds represented by general formula (III) described below. These compounds correspond to the hindered phenols.

The total content of the compound represented by the general formula (I) and the compound represented by the general formula (III) is preferably 0.001% by mass to 10% by mass relative to the weight of the raw material composition.

The raw material composition may contain one or two or more of either the compounds represented by the general formula (I) or the compounds represented by the general formula (III), and may contain one or two or more of the compounds represented by the general formula (I) and one or two or more of the compounds represented by the general formula (III).

<Compound Represented by the General Formula (I)>

The raw material composition preferably contains a compound represented by the general formula (I) below.

[Chem. 4]

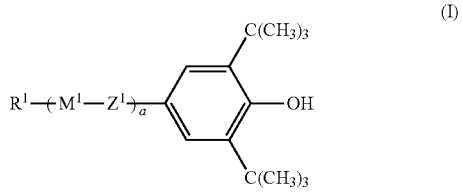

(I)

In the general formula (I), $R^1$ represents a linear alkyl group or branch alkyl group having 1 to 22 carbon atoms, one or two or more —$CH_2$— in the alkyl group may be substituted by —O—, —CH=CH—, —CO—, —OCO—, —COO—, —C≡C—, —$CF_2O$—, or —$OCF_2$— so that oxygen atoms are not directly adjacent to each other.

In the general formula (I), a represents 0, 1, or 2.

In the general formula (I), $M^1$ represents a group selected from the group consisting of (a) a trans-1,4-cyclohexylene group (one —$CH_2$— or two or more nonadjacent —$CH_2$— present in the group may be substituted by —O— or —S—), (b) a 1,4-phenylene group (one —CH= or two or more nonadjacent —CH= present in the group may be substituted by —N=), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chromane-2,6-diyl group. One or two or more hydrogen atoms contained in the group (a), group (b), or group (c) may be each substituted by a fluorine atom, a trifluoromethyl group, a trifluoromethoxy group, or a chlorine atom. When a represents 2 and a plurality of $M^1$ are present, the plurality of $M^1$ present may be the same or different.

In the general formula (I), $Z^1$ represents a single bond, —$CH_2CH_2$—, —CH=CH—, —C≡C—, —$CH_2O$—, —$OCH_2$—, —$CF_2O$—, —$OCF_2$—, —COO—, or —OCO—, and when a represents 2 and a plurality of $Z^1$ are present, the plurality of $Z^1$ present may be the same or different.

Preferably, $R^1$ is a linear alkyl group or branch alkyl group having 1 to 11 carbon atoms. In particular, when a represents 0, $R^1$ is more preferably a linear alkyl group having 2 to 9 carbon atoms, and when a represents 1 or 2, $R^1$ is more preferably a linear alkyl group having 1 to 5 carbon atoms.

Preferably, $M^1$ represents a trans-1,4-cyclohexylene group or a 1,4-phenylene group (one or two or more hydrogen atoms contained in the group may be each substituted by a fluorine atom or a chlorine atom). In particular, a group represented by a general formula below (the right and left sides of the formula are the same as in the general formula (I)),

[Chem. 5]

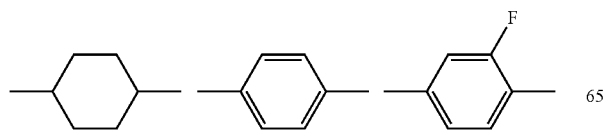

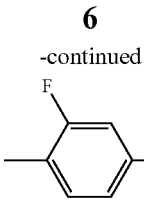

such as a trans-1,4-cyclohexylene group, a 1,4-phenylene group, a 2-fluoro-1,4-phenylene group, or a 3-fluoro-1,4-phenylene group, is preferred, and a trans-1,4-cyclohexylene group or a 1,4-phenylene group is more preferred.

It is preferred that in the general formula (I), $R^1$ represents a linear alkyl group or branch alkyl group having 1 to 11 carbon atoms, $M^1$ represents a trans-1,4-cyclohexylene group or a 1,4-phenylene group, $Z^1$ represents a single bond, and a represents 0 or 1.

For example, when a=0, specific examples of the compound represented by the general formula (I) include compounds represented by formulae (I.1.1) to (I.1.8), and when a=1, specific examples of the compound represented by the general formula (I) include compounds represented by formulae (I.2.1) to (I.2.2), but examples are not particularly limited to these compounds.

[Chem. 6]

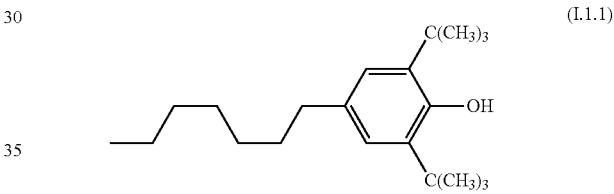

(I.1.1)

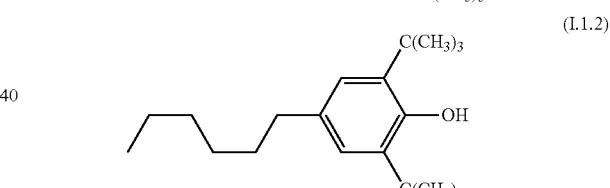

(I.1.2)

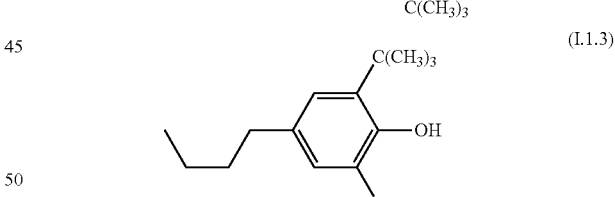

(I.1.3)

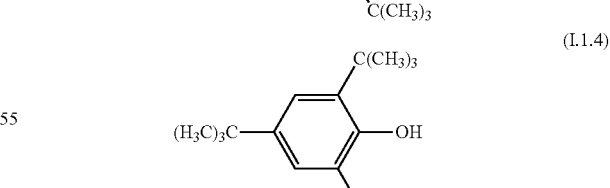

(I.1.4)

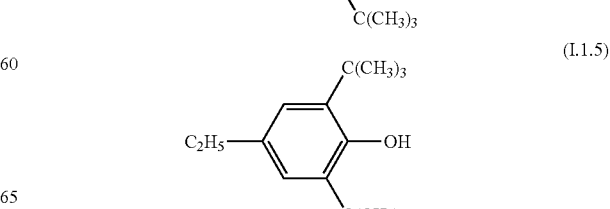

(I.1.5)

-continued

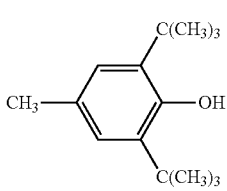
(I.1.6)

[Chem. 7]

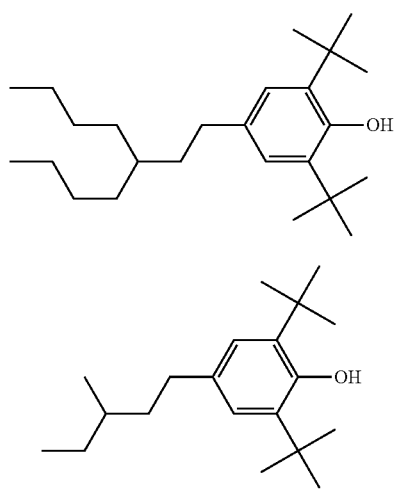
(I.1.7)

(I.1.8)

[Chem. 8]

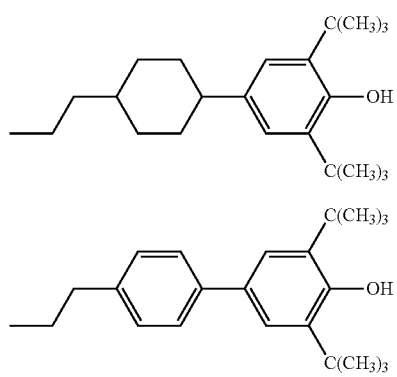
(I.2.1)

(I.2.2)

<Compound Represented by the General Formula (III)>

The raw material composition preferably contains a compound represented by the general formula (III) below.

[Chem. 9]

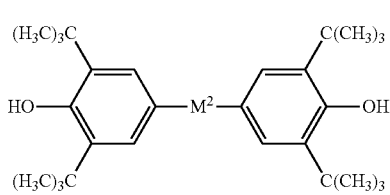
(III)

In the general formula (III), $M^2$ represents an alkylene group having 1 to 15 carbon atoms (one or two or more —$CH_2$— in the alkylene group may be substituted by —O—, —CO—, —COO—, —OCO—, —$CF_2O$—, —$OCF_2$—, —$CF_2$—, —CH=CH—, —C≡C—, a 1,4-phenylene group (one or two or more hydrogen atoms in the 1,4-phenylene group may be substituted by a fluorine atom), or a trans-1,4-cyclohexylene group so that oxygen atoms are not directly adjacent to each other) or a single bond.

The compound represented by the general formula (III) preferably includes at least one compound in which $M^2$ in the general formula (III) represents an alkylene group having 1 to 15 carbon atoms.

Specific examples of the compound represented by the general formula (III) include, but are not particularly limited to, compounds represented by formulae (III.1) to (III.5) below.

[Chem. 10]

(III.1)

(III.2)

(III.3)

(III.4)

(III.5)

<Compound Represented by the General Formula (II)>

The raw material composition preferably contains a compound represented by the general formula (II) below.

[Chem. 11]

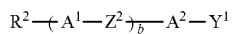
(II)

In the general formula (II), $R^2$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms.

In the general formula (II), b represents 1, 2, 3, or 4.

In the general formula (II), $A^1$ and $A^2$ each independently represent a group selected from the group consisting of (a) a trans-1,4-cyclohexylene group (one —$CH_2$— or two or more nonadjacent —$CH_2$— present in the group may be substituted by —O— or —S—), (b) a 1,4-phenylene group (one —CH= or two or more nonadjacent —CH= present in the group may be substituted by —N=), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chromane-2,6-diyl group, one or two or more hydrogen atoms contained in the group (a), group (b), or group (c) may be each substituted by a fluorine atom, a trifluoromethyl group, a trifluoromethoxy group, or a chlorine atom, and when b represents 2, 3, or 4 and a plurality of $A^1$ are present, the plurality of $A^1$ present may be the same or different.

In the general formula (II), $Z^2$ represents a single bond, —$CH_2CH_2$—, —CH=CH—, —C≡C—, —$CH_2O$—, —$OCH_2$—, —$CF_2O$—, —$OCF_2$—, —COO—, or —OCO—. When b represents 2, 3, or 4 and a plurality of $Z^2$ are present, the plurality of $Z^2$ present may be the same or different.

Y represents a hydrogen atom, a fluorine atom, a chlorine atom, a trifluoromethyl group, a trifluoromethoxy group, an alkyl group having 1 to 6 carbon atoms, an alkenyl group having 2 to 6 carbon atoms, an alkoxy group having 1 to 6 carbon atoms, or an alkenyloxy group having 2 to 6 carbon atoms.

The compound represented by the general formula (II) preferably contains at least one compound in which $R^2$ in the general formula (II) represents an alkenyl group having 2 to 6 carbon atoms.

<First Form of Compound Represented by the General Formula (II)>

The compound represented by the general formula (II) may be a p-type liquid crystal compound having a dielectric anisotropy of $\Delta\varepsilon > 0$ and a large absolute value of $\Delta\varepsilon$.

In a first form, the compound represented by the general formula (II) preferably includes at least one compound in which at least one of $A^1$ and $A^2$ in the general formula (II) represents any one selected from formulae below (the right and left sides of each of the formulae are the same as in the general formula (II)).

[Chem. 12]

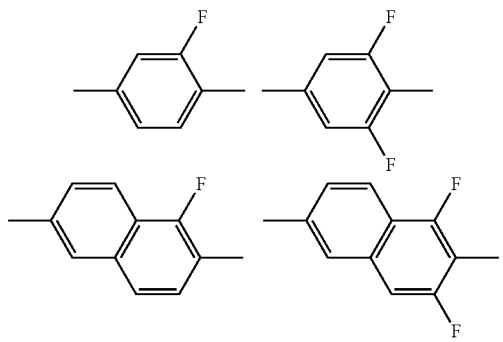

In the first form, in the general formula (II), $Y^1$ is preferably a fluorine atom, a chlorine atom, a trifluoromethyl group, or a trifluoromethoxy group, and $Y^1$ more preferably represents a fluorine atom. Also, in the general formula (II), $R^2$ preferably represents a methyl group, an ethyl group, a propyl group, a butyl group, or a pentyl group, and $Z^1$ preferably represents a single bond, —$CH_2CH_2$—, —$CF_2O$—, or —$OCF_2$—.

In the first form, the compound preferably includes at least one compound in which $R^2$ is an alkenyl group having 2 to 6 carbon atoms.

Specific examples of the compound in the first form represented by the general formula (II) include, but are not particularly limited to, compounds below.

[Chem. 13]

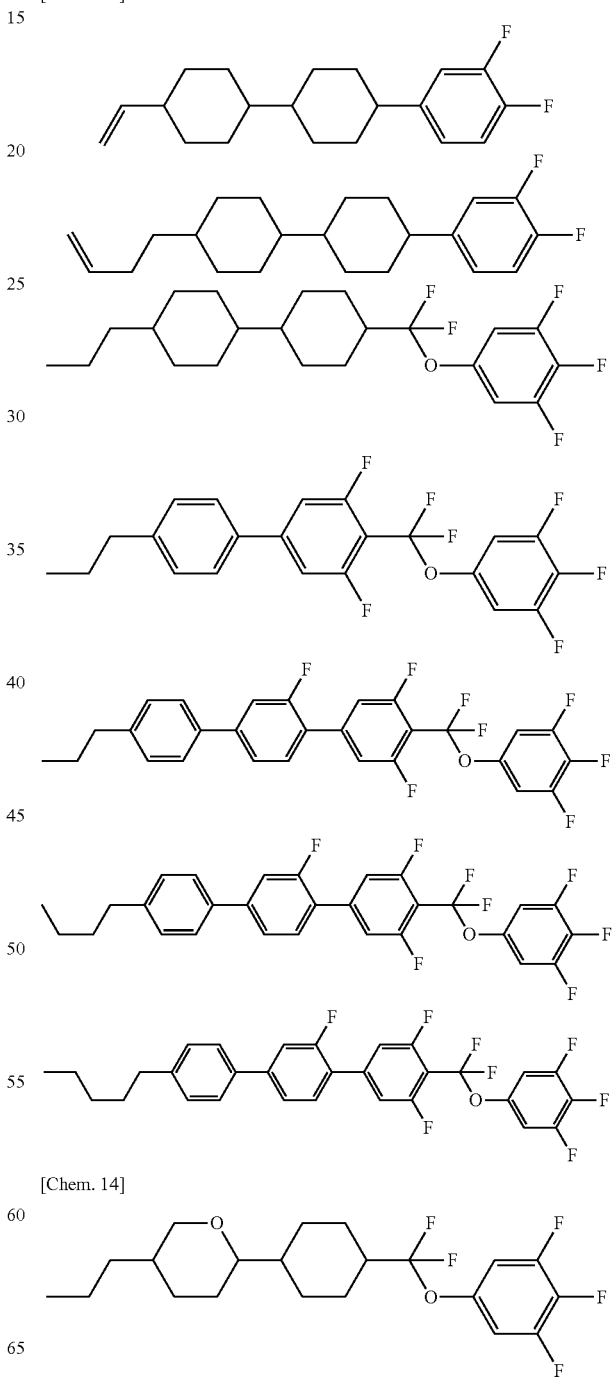

[Chem. 14]

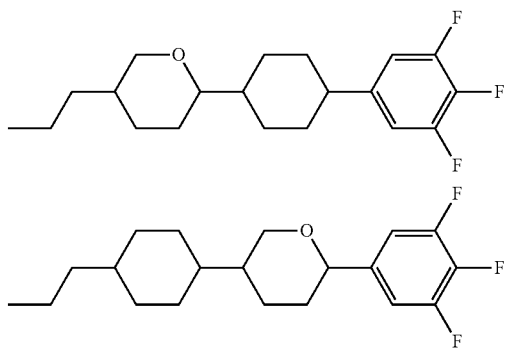

[Chem. 15]

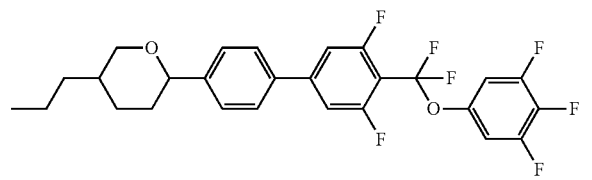

<Second Form of Compound Represented by the General Formula (II)>

The compound represented by the general formula (II) may be a n-type liquid crystal compound having a dielectric anisotropy of $\Delta\varepsilon<0$ and a large absolute value of $\Delta\varepsilon$.

In a second form, the compound represented by the general formula (II) preferably includes at least one compound in which at least one of $A^1$ and $A^2$ in the general formula (II) represents any one selected from formulae below (the right and left sides of each of the formulae are the same as in the general formula (II)),

[Chem. 16]

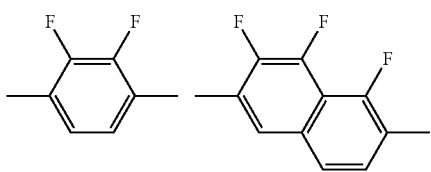

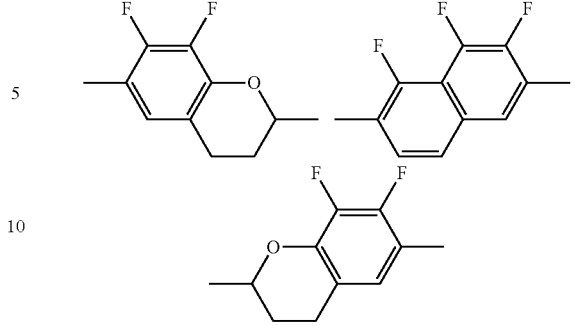

[Chem. 17]

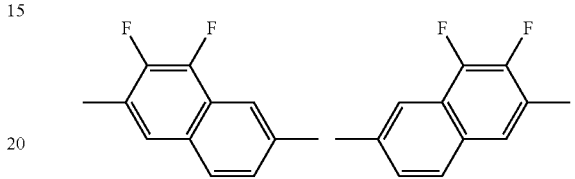

and more preferably includes at least one compound in which at least one of $A^1$ and $A^2$ represents the following.

[Chem. 18]

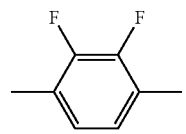

In the second form, in the general formula (II), $R^2$ and $Y^1$ preferably each independently represent a methyl group, an ethyl group, a propyl group, a butyl group, a pentyl group, a vinyl group, a methoxy group, an ethoxy group, a propoxy group, a butoxy group, a pentoxy group, a 3-butenyloxy group, or a 4-pentenyloxy group, and $Z^1$ preferably represents a single bond, —$CH_2CH_2$—, —$CH_2O$—, —$OCH_2$—, —$CF_2O$—, or —$OCF_2$—.

In the second form, the compound preferably contains at least one compound in which $R^2$ is an alkenyl group having 2 to 6 carbon atoms.

Specific examples of the compound in the first form represented by the general formula (II) include, but are not particularly limited to, compounds below.

[Chem. 19]

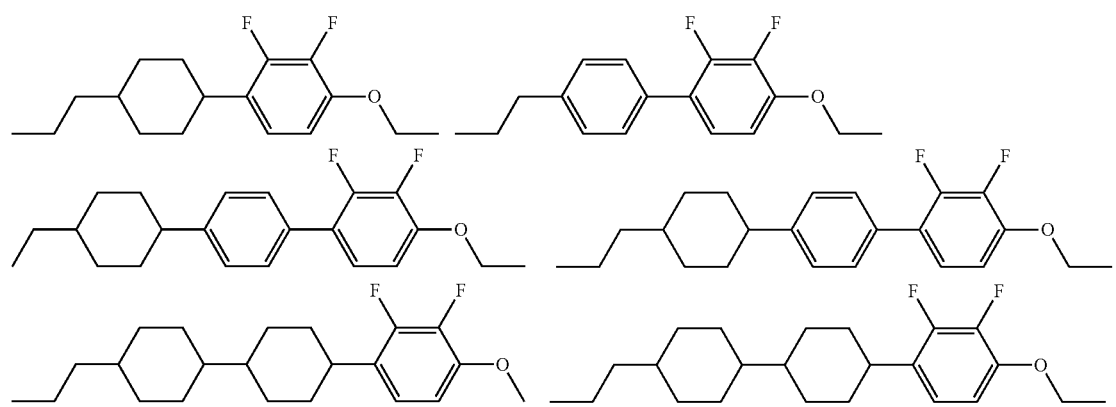

[Chem. 20]

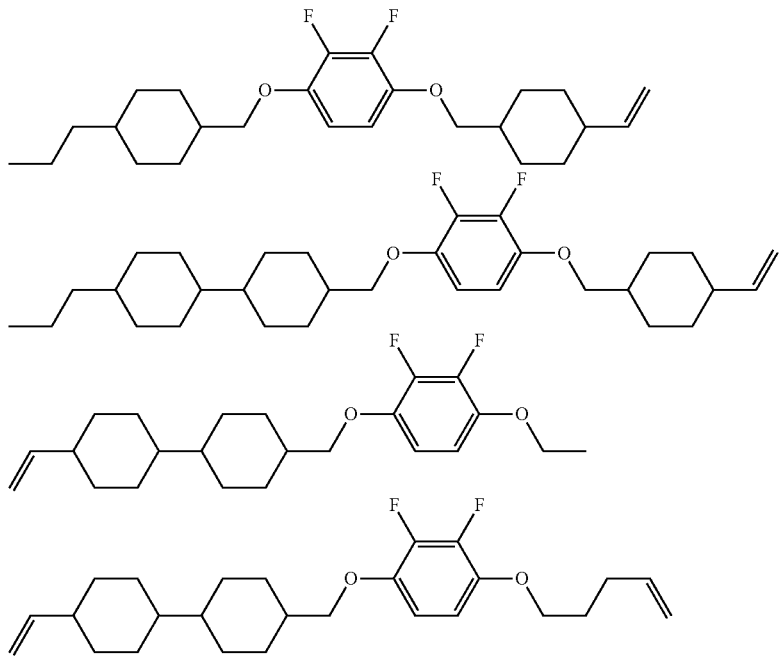

[Chem. 21]

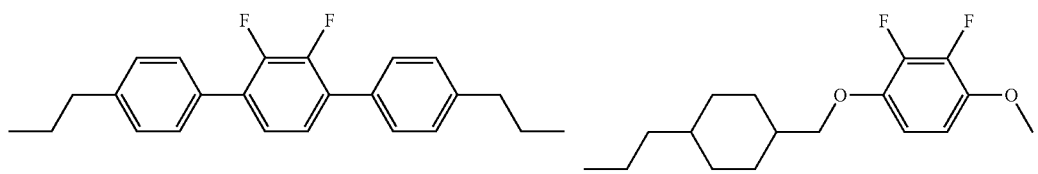

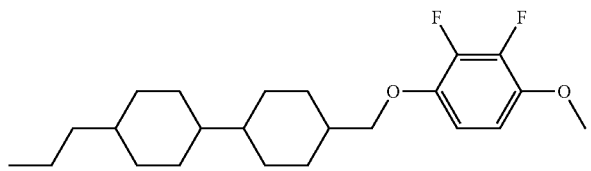

<Third Form of Compound Represented by the General Formula (II)>

The compound represented by the general formula (II) may be a non-polar liquid crystal compound having a relatively small absolute value of dielectric anisotropy Δ∈.

In a third form, $A^1$ and $A^2$ preferably each independently represent a trans-1,4-cyclohexylene group or a 1,4-phenylene group.

In the third form, in the general formula (II), preferably, $R^2$ and $Y^1$ each independently represent an alkyl group having 1 to 6 carbon atoms, an alkenyl group having 2 to 6 carbon atoms, an alkoxy group having 1 to 6 carbon atoms, or an alkenyloxy group having 2 to 6 carbon atoms, and $Z^2$ represents a single bond or —$CH_2CH_2$—.

In the third form, the compound preferably includes at least one compound in which $R^2$ is an alkenyl group having 2 to 6 carbon atoms.

Specific examples of the compound in the third form represented by the general formula (II) include, but are not particularly limited to, compounds below.

[Chem. 22]

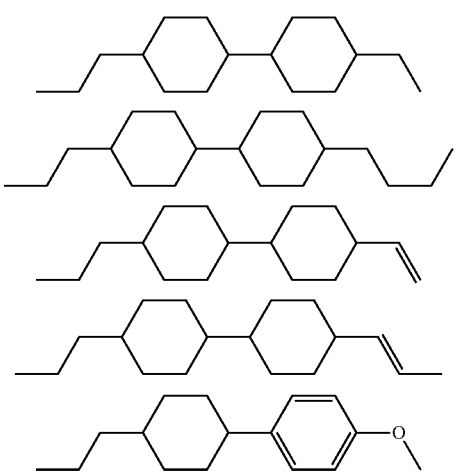

-continued

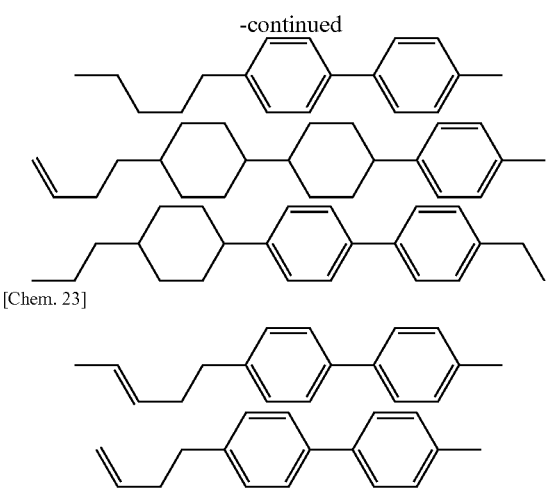
[Chem. 23]

<Compound Represented by General Formula (IV)>

The raw material composition preferably contains a compound represented by general formula (IV) below.

[Chem. 24]

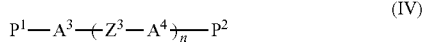  (IV)

In the general formula (IV), $P^1$ and $P^2$ each independently represent an acryloyloxy group, a methacryloyloxy group, a vinyl group, a vinyloxy group, or a monovalent group represented by any one of formulae (Ep-1) to (Ep-7) below.

[Chem. 25]

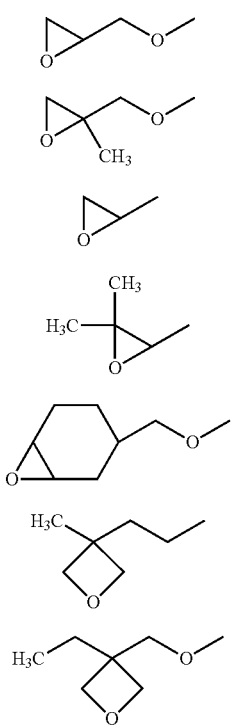

(Ep-1)
(Ep-2)
(Ep-3)
(Ep-4)
(Ep-5)
(Ep-6)
(Ep-7)

A group represented by each of the formulae (Ep-1) to (Ep-7) is bonded at the end of an upper right bond. For example, (Ep-1) represents a glycidyloxy group, and (Ep-3) represents an oxiranyl group.

In the general formula (IV), n represents 0, 1, or 2.

In the general formula (IV), $A^3$ and $A^4$ each independently represent a 1,4-phenylene group or a naphthalene-2,6-diyl group (one or two or more hydrogen atoms contained in the groups may be each substituted by a fluorine atom). When n represents 2 and a plurality of $A^4$ are present, the plurality of $A^4$ present may be the same or different.

In the general formula (IV), $Z^3$ represents —COO—, —OCO—, —CH$_2$CH$_2$COO—, —OCOCH$_2$CH$_2$—, —CH$_2$CH$_2$OCO—, —COOCH$_2$CH$_2$—, —(CH$_2$)$_4$—, —(CH$_2$)$_3$O—, —O(CH$_2$)$_3$—, —CH$_2$CH$_2$OCH$_2$—, —CH$_2$OCH$_2$CH$_2$—, or a single bond. When n represents 2 and a plurality of $Z^3$ are present, the plurality of $Z^3$ present may be the same or different.

In the general formula (IV), $P^1$ and $P^2$ preferably each independently represent an acryloyloxy group or a methacryloyloxy group.

Preferably, $A^3$ and $A^4$ each independently represent a 1,4-phenylene group (one or two or more hydrogen atoms contained in the group may be each substituted by a fluorine atom).

Specific examples of the compound represented by the general formula (IV) include, but are not particularly limited to, compounds below.

[Chem. 26]

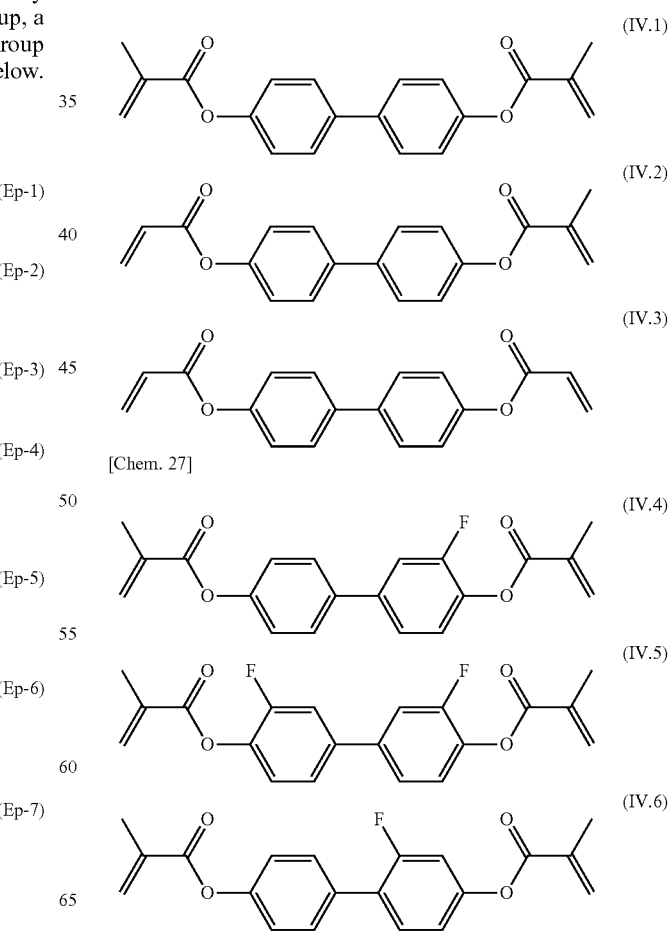

(IV.1)
(IV.2)
(IV.3)

[Chem. 27]

(IV.4)
(IV.5)
(IV.6)

-continued

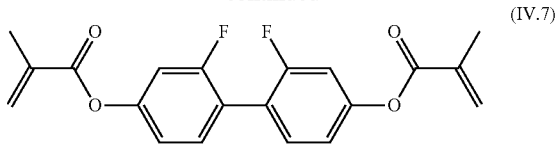

(IV.7)

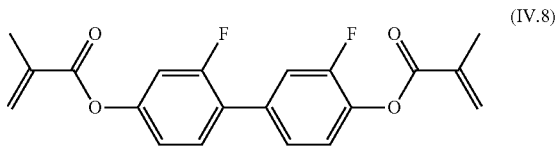

(IV.8)

<Purification Method>

One or a mixture of silica gel, alumina, and an ion exchange resin can be used as the purifying agent. One or a mixture of silica gel and alumina is preferred. Silica gel or alumina may be chemically modified with a hydrophobic group, a hydrophilic group, a functional group, or the like.

The amount of the purifying agent used relative to 100 parts by mass of the raw material composition is preferably 0.1 parts by mass or more, preferably 0.5 parts by mass or more, preferably 1 part by mass or more, preferably 5 parts by mass or more, preferably 10 parts by mass or more, and preferably 30 parts by mass or more, and preferably 1000 parts by mass or less, preferably 500 parts by mass or less, preferably 300 parts by mass or less, preferably 200 parts by mass or less, preferably 100 parts by mass or less, and more preferably 50 parts by mass or less, and may be 10 parts by mass or less.

A method of bringing the raw material composition into contact with the purifying agent is not particularly limited, but, for example, any one of methods (A) to (C) below can be used.

(A) The raw material composition is dissolved in an organic solvent and then passed through a chromatography column filled with the purifying agent, and if required, an organic solvent is further passed through, and the organic solvent is distilled off from the resultant solution.

In this method, the amount of the purifying agent used is preferably 10 parts by mass to 300 parts by mass and more preferably 30 parts by mass to 200 parts by mass relative to 100 parts by mass of the raw material composition. In addition, the total content of one or two or more compounds selected from the compound group consisting of compounds represented by the general formula (I) and compounds represented by the general formula (III) is preferably 0.1% by mass to 10% by mass and more preferably 1% by mass to 5% by mass relative to the weight of the raw material composition. After the solution is passed through the chromatography column, if required, the organic solvent may be further pass through and combined (mixed) with the resultant solution.

(B) The raw material composition is dissolved in an organic solvent, the purifying agent is added to the resultant solution and stirred for a predetermined time, the purifying agent used is removed by filtration, and then the organic solvent is distilled off.

In this method, the amount of the purifying agent used is preferably 0.1 parts by mass to 100 parts by mass, more preferably 0.5 parts by mass to 50 parts by mass, and particularly preferably 0.5 parts by mass to 10 parts by mass relative to 100 parts by mass of the raw material composition. In addition, the total content of one or two or more compounds selected from the compound group consisting of compounds represented by the general formula (I) and compounds represented by the general formula (III) is preferably 0.001% by mass to 1% by mass and more preferably 0.01% by mass to 0.5% by mass relative to the mass of the raw material composition.

(C) The purifying agent is added to the raw material composition in a liquid crystal state or isotropic liquid state and stirred for a predetermined time, and the purifying agent used is removed by filtration.

In this method, the amount of the purifying agent used is preferably 0.1 parts by mass to 100 parts by mass, more preferably 0.5 parts by mass to 50 parts by mass, and particularly preferably 0.5 parts by mass to 10 parts by mass relative to 100 parts by mass of the raw material composition. In addition, the total content of one or two or more compounds selected from the compound group consisting of compounds represented by the general formula (I) and compounds represented by the general formula (III) is preferably 0.001% by mass to 1% by mass and more preferably 0.01% by mass to 0.5% by mass relative to the mass of the raw material composition. In this case, the purifying agent can be added to the raw material composition not containing the organic solvent, and thus the organic solvent need not be distilled off.

As in (A) and (B), when the raw material composition is dissolved in the organic solvent, the organic solvent is preferably a saturated or aromatic hydrocarbon having 6 to 9 carbon atoms, and preferably does not contain a carbon-carbon unsaturated bond other than a benzene ring. Examples thereof include alkanes, cycloalkanes, alkylcycloalkanes, benzene, alkylbenzene, dialkylbenzene, and the like. Specific examples of these hydrocarbon solvents include hexane and structural isomers thereof (noncyclic saturated hydrocarbons having 6 carbon atoms), heptane and structural isomers thereof (noncyclic saturated hydrocarbons having 7 carbon atoms), octane and structural isomers thereof (noncyclic saturated hydrocarbons having 8 carbon atoms), petroleum ether, benzene, toluene, xylene, and cumene, and a single solvent selected from these hydrocarbon solvents or a mixed solvent containing one or two or more of these solvents is preferred, and a single solvent selected from hexane and structural isomers thereof, heptane and structural isomers thereof, and toluene or a mixed solvent containing one or two or more of these solvents is more preferred. The term "single solvent" represents an organic solvent including substantially one compound selected from the hydrocarbon solvents described above. The mixed solvent may be a mixed solvent containing two or more hydrocarbon solvents or a mixed solvent containing one or more hydrocarbon solvents and one or more other solvents. However, an organic solvent containing small amounts of inevitable impurities (for example, homologues which differ by about 1 or 2 carbon atoms, etc.) can be used as the organic solvent. Petroleum ether is a mixed solvent containing hexane and a structural isomer thereof as main components, but may further contain pentane or a structural isomer thereof. Xylene may be a mixture of ortho-, meta-, and para-isomers and arbitrarily may or may not contain ethylbenzene. Undesired impurities, such as moisture, sulfur compounds, heavy metals, etc. are preferably removed as much as possible from the organic solvent used, and is the organic solvent is preferably properly selected according to the required cost and purification level. A polar solvent, for example, methanol, ethanol, 1-propanol, 2-propanol, acetone, 2-butanone, ethyl acetate, diethyl ether, tetrahydrofuran, methyl-tert-butyl ether, acetonitrile, or propionitrile, is preferably added as a solvent other than hydrocarbon solvents in order to prevent the occurrence of static electricity. In this case, the total content of a polar solvent is preferably 50% by volume or less, preferably 30% by volume or less, preferably 10% by volume or less, and preferably 5% by volume or less, and preferably 0.1% by volume or more, preferably 0.5% by volume or more, and preferably 1% by volume or more.

The target compound or composition (hereinafter referred to as the "target substance") obtained by the purification step is changed in composition from the raw material composition by partially or entirely removing unnecessary impurities. The target substance is required to contain at least the compound constituting the liquid crystal material (one or two or more compounds selected from the compound group represented by the general formula (II) and the general formula (IV)). The target substance is preferably a composition containing one or two or more compounds selected from the compound group represented by the general formula (II). The target substance is preferably a composition containing one or two or more compounds selected from the compound group represented by the general formula (II) and further containing one or two or more compounds selected from the compound group represented by the general formula (IV).

Further, the target substance is preferably a composition containing hindered phenol (one or two or more compounds selected from the compound group represented by the general formula (I) and the general formula (III)). However, the target substance may not contain one or two or more compounds selected from the compound group represented by the general formula (I) and the general formula (III). Also, the target substance may contain only one compound selected from the compound group represented by the general formula (II) and the general formula (IV). The present invention can be used as a method for producing a compound selected from the compound group represented by the general formula (II) or the general formula (IV).

In the present invention when the target substance is one compound, the phrase "a method for producing a composition" includes a method for producing one compound selected from the compound group represented by the general formula (II) and a method for producing one compound selected from the compound group represented by the general formula (IV). The composition obtained by the method for producing a composition of the present invention includes the case where the target substance is one compound.

As described in Background Art, among compounds constituting liquid crystal materials, a compound having an alkenyl group or a polymerizable group in a side chain has a strong tendency to cause reaction such as dimerization or decomposition by contact with silica gel or the like, resulting in a decrease in purity and a decrease in resistivity value with the decrease in purity. Therefore, the target substance is preferably a compound or composition containing at least one compound in which $R^2$ in the general formula (II) is an alkenyl group having 2 to 6 carbon atoms. Also, the target substance is preferably a compound or composition containing at least one compound represented by the general formula (IV).

The compound constituting the liquid crystal material (one or two or more compounds selected from the compound group represented by the general formula (II) and the general formula (IV)) preferably has as high a rate as possible of recovery before and after the purification step. The rate of recovery refers to a percentage (%) determined by $100 \times (m_1/m_0)$ wherein $m_0$ represents the mass of the compound contained in the raw material composition, and $m_1$ represents the mass of the compound contained in the target composition.

Also, hindered phenols (one or two or more compounds selected from the compound group represented by the general formula (I) and the general formula (III)) need not necessarily have a high rate of recovery and need not necessarily have low rate of recovery. For example, when the target composition is used as a liquid crystal material, a predetermined amount or more of the hindered phenol remaining in in the target composition can be desirably continuously used as an antioxidant of the liquid crystal material.

A composition ratio between compounds represented by the general formulae (I) to (IV) may be changed before and after contact with the purifying agent. This is because the compounds have different adsorption powers to the purifying agent. In addition, the contents of the compound represented by the general formula (I) and the compound represented by the general formula (III) may be decreased or disappear before and after contact with the purifying agent, and in this case, the resultant composition may be directly used as a liquid crystal material or, if required, the compound represented by the general formula (I) or the compound represented by the general formula (III) may be added.

When the composition obtained by the purification step contains the solvent, if required, the compound represented by the general formula (I) or the compound represented by the general formula (III) is preferably added before the solvent is distilled off.

When the target composition is used as the liquid crystal material, the resultant target composition may be directly used. Also, the composition of the necessary liquid crystal material may be adjusted by mixing two or more resultant target compositions.

The compounds used in the present invention preferably do not have a peroxide (—OO—, —CO—OO—) structure such as peracid in its molecule, that is, oxygen atoms are not directly adjacent to each other. When reliability and long-term stability of the liquid crystal composition are regarded as important, a compound having a carbonyl group is preferably not used. When UV irradiation stability is regarded as important, a compound substituted by a chlorine atom is preferably not used.

The liquid crystal composition of the present invention can contain a polymerizable compound in order to manufacture a liquid crystal display device of a polymer stabilized (PS) mode, a polymer sustained alignment (PSA) mode, a horizontal electric field-type PSVA (polymer stabilized vertical alignment) mode, or the like. Examples of the polymerizable compound which can be used include photopolymerizable monomers subjected to polymerization that proceeds by energy rays such as light, and polymerizable compounds having as a structure a liquid crystal skeleton in which a plurality of six-member rings are connected to each other, such as biphenyl derivatives, terphenyl derivatives, and the like.

When the monomer is added to the liquid crystal composition of the present invention, polymerization proceeds even in the absence of a polymerization initiator, but the polymerization initiator may be added for accelerating polymerization. Examples of the polymerization initiator include benzoin ethers, benzophenones, acetophenones, benzylketals, acylphosphine oxides, and the like.

The liquid crystal composition containing the polymerizable compound of the present invention is imparted with a liquid crystal alignment ability when the polymerizable compound contained is polymerized by irradiation with ultraviolet light, and is used for a liquid crystal display device in which a quantity of light transmitted is controlled by using birefringence of the liquid crystal composition. The liquid crystal composition is useful for liquid crystal display devices, such as AM-LCD (active matrix liquid crystal display device), TN (twisted nematic liquid crystal display device), STN-LCD (super twisted nematic liquid crystal display device), OCB-LCD, IPS-LCD (in-plane switching liquid crystal display device), and FFS (fringe field switching-mode liquid crystal display device), particularly useful for AM-LCD having an active matrix address device, and can be used for transmissive or reflective liquid crystal display devices.

Two substrates of a liquid crystal cell used in a liquid crystal display device can be formed by using a transparent material with flexibility, such as glass or plastic, and one of the two substrates may be made of an opaque material such as silicon or the like. A transparent substrate including a transparent electrode layer can be formed by, for example, sputtering indium tin oxide (ITO) on a transparent substrate such as a glass plate or the like.

A color filter can be formed by, for example, a pigment dispersion method, a printing method, an electrodeposition method, a dyeing method, or the like. The method for forming a color filter by the pigment dispersion method is described as an example. A curable colored composition for a color filter is applied on the transparent substrate, patterned, and then cured by heating or light irradiation. This process is performed for each of the three colors of red, green, and blue, thereby forming a pixel portion for a color filter. In addition, a pixel electrode provided with an active element such as TFT, a thin-film diode, a metal-insulator-metal-resistivity element, or the like may be installed on the substrate.

The substrates are opposed to each other so that the transparent electrode layers face inward. In this case, the gap between the substrates may be adjusted through spacers.

The resulting light control layer is preferably adjusted to have a thickness of 1 to 100 µm. The thickness is more preferably 1.5 to 10 µm, and when a polarizing plate is used, the product of refractive index anisotropy Δn of a liquid crystal and cell thickness d is preferably adjusted to maximize contrast. When two polarizing plates are used, an angle of view and contrast can be improved by adjusting the polarizing axis of each of the polarizing plates. Further, a retardation film can be used for widening the angle of view. Examples of the spacers include glass particles, plastic particles, alumina particles, columnar spacers made of a photoresist material, and the like. Then, a sealing agent such as an epoxy-based heat-curable composition or the like is screen-printed in a form having a liquid crystal inlet on each of the substrates, the substrates are bonded together, and then the sealing agent is thermally cured by heating.

A usual vacuum injection method or one drop fill (ODF) method can be used as a method for holding the liquid crystal composition containing the polymerizable compound between the substrates. However, the vacuum injection method has the problem of leaving injection marks, in spite of causing no dropping marks. The present invention can preferably use the ODF method in a process for manufacturing a liquid crystal display device. In the process for manufacturing a liquid crystal display device using the ODF method, the liquid crystal display device can be manufactured by applying an epoxy-based light/heat curable sealing agent on a substrate of either a back plane or a front plane by using a dispenser to draw a closed loop bank-like shape, dropping a predetermined amount of the liquid crystal composition in the shape under deaeration, and then bonding together the front plane and the back plane. The liquid crystal composition of the present invention can be stably dropped in the ODF step and thus can be preferably used.

Since an appropriate polymerization rate is desired for achieving good liquid crystal-aligning performance, a preferred method of polymerizing the polymerizable compound is a polymerization method in which the compound is polymerized by irradiation with one or combination of two or more of active energy rays such as ultraviolet light, electron beams, and the like, or by sequential irradiation with these active energy rays. When ultraviolet light is used, either a polarized light source or an unpolarized light source may be used. When the liquid crystal composition containing the polymerizable compound is polymerized in a state of being held between the two substrates, at least the substrate on the irradiation surface side must be imparted with proper transparency to the active energy rays. In addition, another method may be used, in which only a specified portion is polymerized by using a mask during light irradiation, and then the alignment state of an unpolymerized portion is changed by changing a condition such as an electric field, a magnetic field, or a temperature, followed by further polymerization by irradiation with active energy rays. In particular, ultraviolet exposure is preferably performed by applying an alternating-current electric field to the liquid crystal composition containing the polymerizable compound. The alternating-current electric field is preferably applied with an alternating current at a frequency of 10 Hz to 10 kHz, more preferably a frequency of 60 Hz to 10 kHz, and a voltage selected depending on a desired pre-tilt angle of the liquid crystal display device. That is, the pre-tilt angle of the liquid crystal display device can be controlled by the voltage applied. In a horizontal electric field-type MVA-mode liquid crystal display device, the pre-tilt angle is preferably controlled to 80 degrees to 89.9 degrees from the viewpoint of alignment stability and contrast.

The temperature during irradiation preferably falls in a temperature range in which the liquid crystal state of the liquid crystal composition of the present invention can be maintained. Polymerization is preferably performed at a temperature close to room temperature, typically a temperature of 15° C. to 35° C. A metal halide lamp, a high-pressure mercury lamp, a superhigh-pressure mercury lamp, or the like can be used as a lamp which generates ultraviolet light. With respect to a wavelength of irradiating ultraviolet light, irradiation with ultraviolet light within a wavelength region which is not an absorption wavelength region of the liquid crystal composition is preferred, and if required, ultraviolet light is preferably partially cut off. The intensity of irradiating ultraviolet light is preferably 0.1 mW/cm$^2$ to 100 W/cm$^2$ and more preferably 2 mW/cm$^2$ to 50 W/cm$^2$. A quantity of irradiating ultraviolet light energy can be appropriately adjusted, but it is preferably 10 mJ/cm$^2$ to 500 J/cm$^2$, and more preferably 100 mJ/cm$^2$ to 200 J/cm$^2$. During ultraviolet irradiation, the intensity may be changed. The time required for ultraviolet irradiation is appropriately selected according to the intensity of irradiating ultraviolet light, but is preferably 10 seconds to 3600 seconds and more preferably 10 seconds to 600 seconds.

The liquid crystal display device using the liquid crystal composition of the present invention satisfies both fast response and the suppression of display defects and is useful, particularly useful for liquid crystal display devices for active matrix driving, and can be used for liquid crystal display devices for a VA mode, a PSVA mode, a PSA-mode, an IPS mode, a FFS (fringe field switching) mode, or an ECB mode.

EXAMPLES

The present invention is described in further detail below by way of examples, but the present invention is not limited to these examples. In the examples and comparative examples below, "%" in a composition represents "% by mass". Purity was calculated from an area ratio according to gas chromatography (column:DB-1, carrier gas:helium).

Example 1

To 100 g of a compound represented by formula (II-1) below,

[Chem. 28]

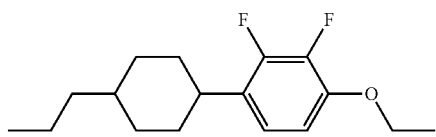 [SMILES: CCCC1CCC(c2ccc(OCC)c(F)c2F)CC1]
(II-1)

1 g of compound represented by formula (I-1) below was added to prepare a composition (C-1).

[Chem. 29]

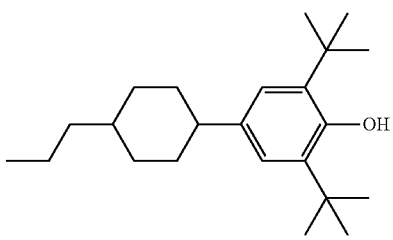
(I-1)

As a result of measurement of purity of the composition (C-1), 0.014% of impurities other than constituent components of the composition (C-1) were detected. The composition (C-1) was dissolved in 400 mL of hexane, poured into a chromatography column (filled with 50 g of silica gel as a purifying agent), and flowed until the surface of the solution coincided with the upper surface of a purifying agent layer. Further, 300 mL of hexane as a developing solvent was added to elute compounds adsorbed on the purifying agent. The solvent was distilled off from the resultant solution under reduced pressure. As a result of measurement of purity of the resultant composition, 0.013% of impurities other than constituent components of the composition (C-1) were detected. Also, a liquid crystal composition prepared by adding 20% of the resultant composition to a composition having a resistivity value of $1.0 \times 10^3$ $\Omega \cdot m$ and represented by formula (II-2) below had a resistivity value of $2.0 \times 10^{12}$ $\Omega \cdot m$.

[Chem. 30]

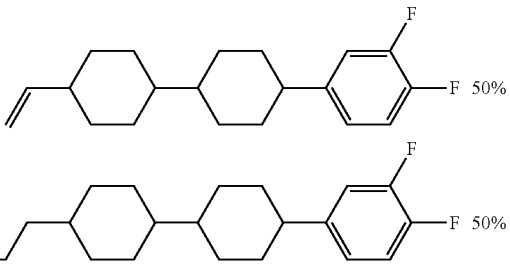
(II-2)

Further, a liquid crystal display device manufactured using the liquid crystal composition exhibited good characteristics without causing display defects.

The above results revealed that a composition having a high resistivity value can be produced by the purification method without deterioration in compounds constituting the composition.

Example 2

To 100 g of a compound represented by formula (II-3) below,

[Chem. 31]

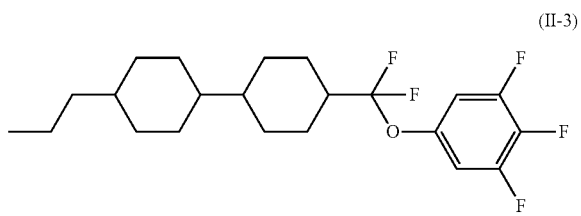
(II-3)

1 g of compound represented by the above formula (I-1) was added to prepare a composition (C-2). As a result of measurement of purity of the composition (C-2), 0.021% of impurities other than constituent components of the composition (C-2) were detected. The same treatment as in Example 1 was conducted for the composition (C-2), and measurement of purity of the resultant composition showed 0.018% of impurities other than constituent components of the composition (C-2). Also, a liquid crystal composition prepared by adding 20% of the resultant composition to a composition represented by the above formula (II-2) had a resistivity value of $1.4 \times 10^{12}$ $\Omega \cdot m$. Further, a liquid crystal display device manufactured using the composition exhibited good characteristics without causing display defects.

The above results revealed that a composition having a high resistivity value can be produced by the purification method without deterioration in compounds constituting the composition.

Example 3

To 100 g of a compound represented by formula (II-4) below,

[Chem. 32]

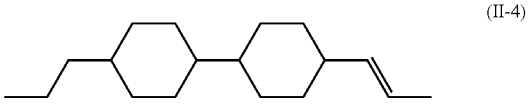
(II-4)

1 g of the compound represented by the above formula (I-1) was added to prepare a composition (C-3). As a result of measurement of purity of the composition (C-3), 0.009% of impurities other than constituent components of the composition (C-3) were detected. The same treatment as in Example 1 was conducted for the composition (C-3), and measurement of purity of the resultant composition showed 0.009% of impurities other than constituent components of the composition (C-3). Also, a liquid crystal composition prepared by adding 20% of the resultant composition to a composition represented by the above formula (II-2) had a resistivity value of $9.2 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 4

As in Example 3, 1 g of the compound represented by the above formula (I-1) was added to 100 g of the compound represented by the formula (II-4) to prepare a composition (C-3), 101 g of the composition (C-3) was dissolved by adding 400 mL of hexane, and 1 g of silica gel was added to the solution, followed by stirring for 1 hour. The silica gel was removed by filtration, and the solvent was distilled off from the filtrate under reduced pressure. As a result of measurement of purity of the resultant composition, 0.008% of impurities other than constituent components of the composition (C-3) were detected. Also, a liquid crystal composition prepared by adding 20% of the resultant composition to a composition represented by the above formula (II-2) had a resistivity value of $9.0 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 5

A composition represented by formula (LC-1) below was prepared, and

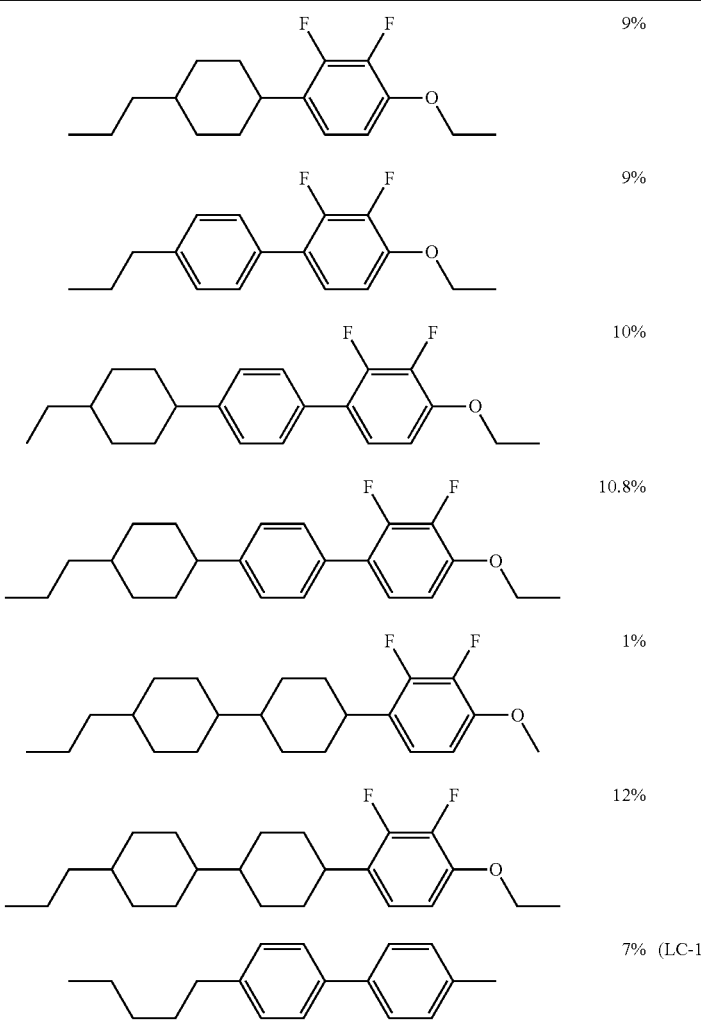

[Chem. 33]

-continued

[Chem. 33]

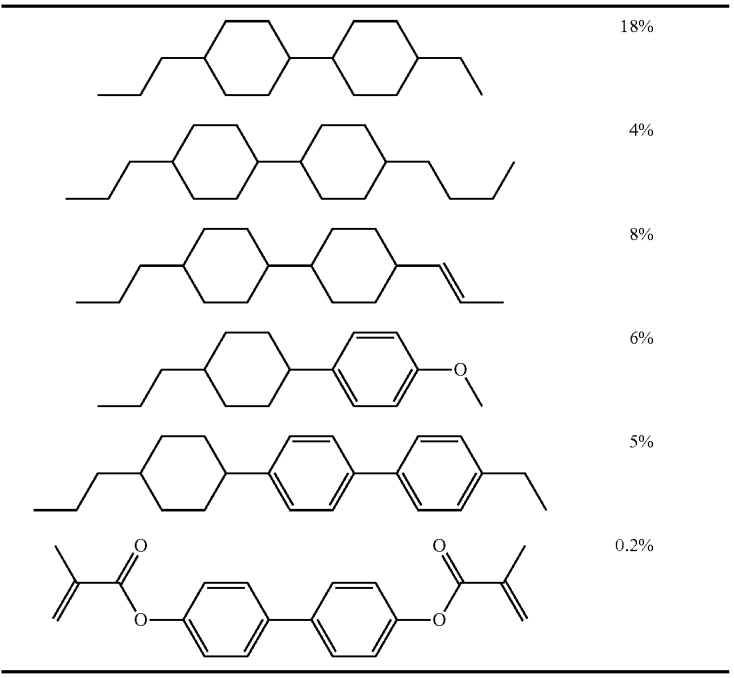

1 g of the compound represented by the above formula (I-1) was added to 100 g of the composition to prepare a composition (C-5). As a result of measurement of purity of the composition (C-5), 0.014% of impurities other than constituent components of the composition (C-5) were detected. The composition (C-5) was dissolved in 400 mL of hexane, poured into a chromatography column (filled with 50 g of silica gel as a purifying agent), and flowed until the surface of the solution coincided with the upper surface of a purifying agent layer. Further, 300 mL of hexane as a developing solvent was added to elute compounds adsorbed on the purifying agent. The solvent was distilled off from the resultant solution under reduced pressure. As a result of measurement of purity of the resultant composition, 0.013% of impurities other than constituent components of the composition (C-5) were detected. Also, the resultant composition had a resistivity value of $2.0 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 6

A composition represented by formula (LC-2) below was prepared, and

[Chem. 34]

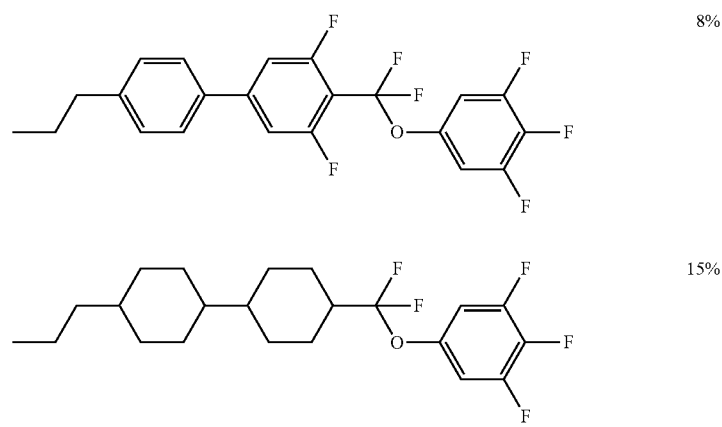

[Chem. 34]

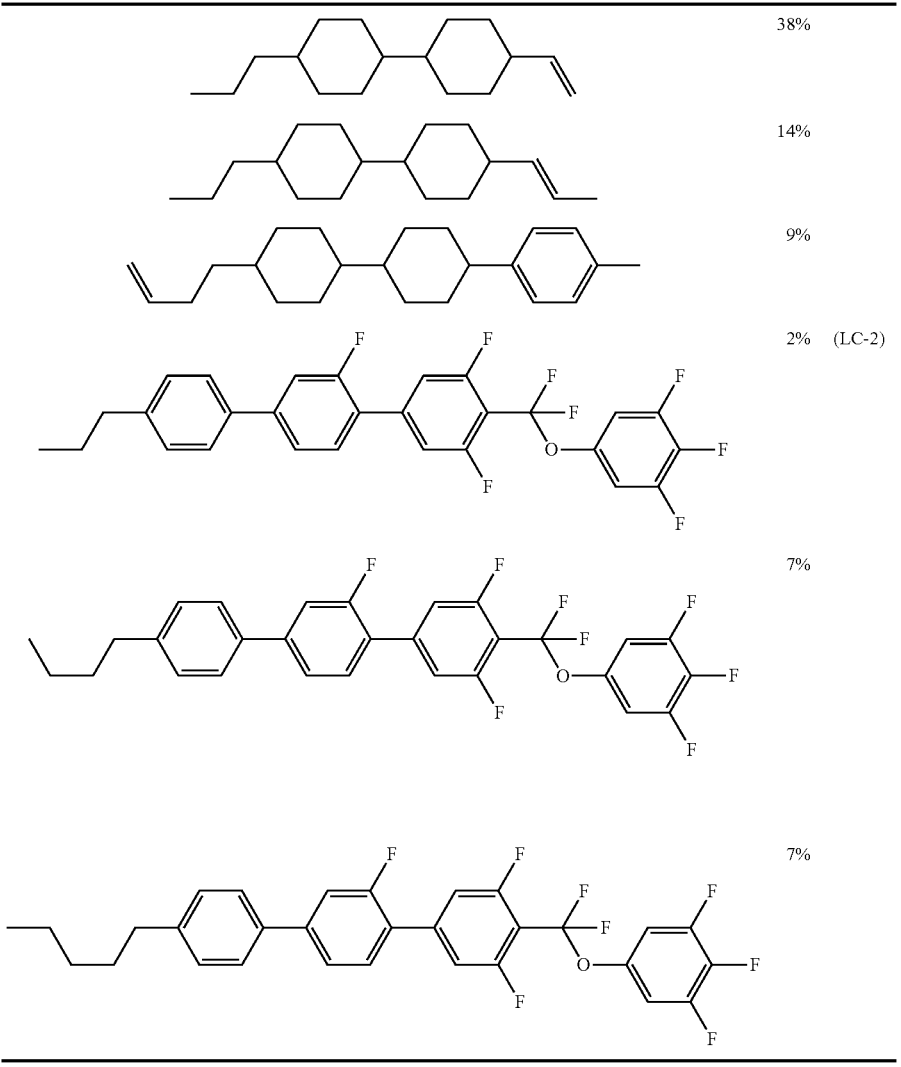

1 g of the compound represented by the above formula (I-1) was added to 100 g of the composition to prepare a composition (C-6). As a result of measurement of purity of the composition (C-6), 0.022% of impurities other than constituent components of the composition (C-6) were detected. The composition (C-6) was dissolved in 400 mL of hexane, and 1 g of silica gel was added to the resultant solution, followed by stirring for 1 hour. The silica gel was removed by filtration, and the solvent was distilled off from the filtrate under reduced pressure. Measurement of purity of the resultant composition showed 0.014% of impurities other than constituent components of the composition (C-6). Also, the resultant composition had a resistivity value of $1.8 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 7

As in Example 5, 1 g of the compound represented by the above formula (I-1) was added to 100 g of the composition represented by the formula (LC-1) to prepare a composition (C-5), and 1 g of silica gel was added to 101 g of the composition (C-5), followed by stirring for 1 hour. The silica gel was removed by filtration, and measurement of purity of the resultant composition showed 0.011% of impurities other than constituent components of the composition (C-5). Also, the resultant composition had a resistivity value of $1.6 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 8

The same operations as in Example 1 were performed except that in Example 1, a compound represented by formula (I-2) below was used instead of the compound represented by the above formula (I-1).

[Chem. 35]

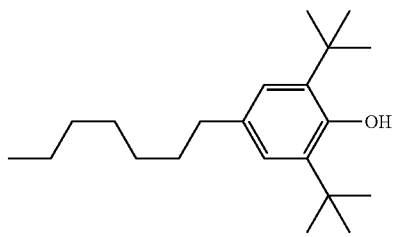

(I-2)

Measurement of purity of the resultant composition showed 0.013% of impurities other than constituent components of the composition. Also, a liquid crystal composition prepared by adding 20% of the resultant composition to the composition represented by the formula (II-2) had a resistivity value of $2.2 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 9

As in Example 5, 1 g of the compound represented by the above formula (I-2) was added to 100 g of the composition represented by the formula (LC-1) to prepare a composition (C-9). As a result of measurement of purity of the resultant composition (C-9), 0.014% of impurities other than constituent components of the composition (C-9) were detected. The composition (C-9) was dissolved in 400 mL of hexane, and 1 g of silica gel was added to the resultant solution, followed by stirring for 1 hour. The silica gel was removed by filtration, and the solvent was distilled off from the filtrate under reduced pressure. Measurement of purity of the resultant composition showed 0.013% of impurities other than the constituent components of the composition (C-9). Also, the resultant composition had a resistivity value of $2.0 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 10

As in Example 6, 1 g of the compound represented by the above formula (I-1) was added to 100 g of the composition represented by the formula (LC-2) to prepare a composition (C-6), and 1 g of silica gel was added to 101 g of the resultant composition (C-6), followed by stirring for 1 hour. The silica gel was removed by filtration, and measurement of purity of the resultant composition showed 0.021% of impurities other than the constituent components of the composition (C-6). Also, the resultant composition had a resistivity value of $1.8 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 11

The same operations as in Example 1 were performed except that in Example 1, a compound represented by formula (III-1) below was used instead of the compound represented by the above formula (I-1).

[Chem. 36]

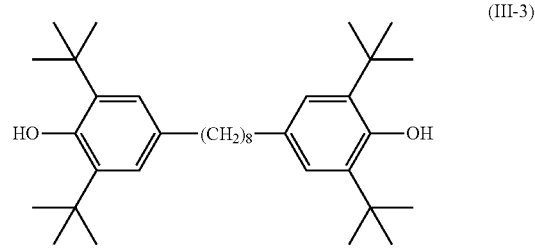

(III-3)

Measurement of purity of the resultant composition showed 0.013% of impurities other than constituent components of the composition. Also, a liquid crystal composition prepared by adding 20% of the resultant composition to the composition represented by the formula (II-2) had a resistivity value of $2.6 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Example 12

The same operations as in Example 1 were performed except that in Example 1, 100 g of alumina was used instead of 50 g of silica gel. Measurement of purity of the resultant composition showed 0.014% of impurities other than constituent components of the composition. Also, a liquid crystal composition prepared by adding 20% of the resultant composition to a composition represented by the formula (II-2) had a resistivity value of $1.8 \times 10^{12}$ Ω·m. Further, a liquid crystal display device manufactured using the composition exhibited good characteristics without causing display defects.

The above results revealed that a composition having a high resistivity value can be produced by the purification method without deterioration in compounds constituting the composition.

Comparative Example 1

As a result of measurement of purity of a compound (hereinafter referred to as a "compound (II-3)") represented by the formula (II-3), 0.014% of impurities were detected. Then, 100 g of the compound (II-3) was dissolved in 400 mL of hexane, poured into a chromatography column (filled with 50 g of silica gel as a purifying agent), and flowed until the surface of the solution coincided with the upper surface of a purifying agent layer. Further, 300 mL of hexane as a developing solvent was added to elute compounds adsorbed on the purifying agent. The solvent was distilled off from the resultant solution under reduced pressure. As a result of measurement of purity of the resultant compound (II-3), 0.017% of impurities were detected. Also, a liquid crystal composition prepared by adding 20% of the resultant compound (II-3) to a composition represented by the formula (II-2) had a resistivity value of $5.6 \times 10^{11}$ Ω·m. Further, a liquid crystal display device manufactured using the composition exhibited good characteristics without causing display defects.

The above results revealed that in the purification method of this comparative example, the purity of the compound is decreased by contact with silica gel, and the resistivity value is also unsatisfactory. It is considered that the compound represented by the formula (II-3) is partially degraded by contact with silica gel.

Comparative Example 2

As in Example 5, 100 g of a composition (hereinafter referred to as a "composition (LC-1)") represented by the formula (LC-1) was prepared, and as a result of measurement of purity, 0.014% of impurities other than the constituent components of the composition (LC-1) were detected. Then, 100 g of the composition (LC-1) was dissolved in 400 mL of hexane, poured into a chromatography column (filled with 50 g of silica gel as a purifying agent), and flowed until the surface of the solution coincided with the upper surface of a purifying agent layer. Further, 300 mL of hexane as a developing solvent was added to elute compounds adsorbed on the purifying agent. The solvent was distilled off from the resultant solution under reduced pressure. Measurement of purity of the resultant composition showed 0.016% of impurities other than the constituent components of the composition (LC-1). Also, the resultant composition prepared had a resistivity value of $4.2 \times 10^{11}$ Ω·m.

The above results revealed that in the purification method of this comparative example, the purity of the composition is decreased by contact with silica gel, and the resistivity value is also unsatisfactory. It is considered that the compounds constituting the composition represented by the formula (LC-1) are partially degraded by contact with silica gel.

Comparative Example 3

As in Example 6, 100 g of a composition (hereinafter referred to as a "composition (LC-2)") represented by the formula (LC-2) was prepared, and as a result of measurement of purity, 0.022% of impurities other than the constituent components of the composition (LC-2) were detected. Then, 100 g of the composition (LC-2) was dissolved in 400 mL of hexane and 1 g of silica gel was added to the resultant solution, followed by stirring for 1 hour. The silica gel was removed by filtration and the solvent was distilled off from the filtrate under reduced pressure. Measurement of purity of the resultant composition showed 0.024% of impurities other than the constituent components of the composition (LC-2). Also, the resultant composition had a resistivity value of $5.8 \times 10^{11}$ Ω·m. Further, a liquid crystal display device manufactured using the resultant composition exhibited good characteristics without causing display defects.

The above results revealed that in the purification method of this comparative example, the purity of the composition is decreased by contact with silica gel, and the resistivity value of the composition is also unsatisfactory. It is considered that the compounds constituting the composition represented by the formula (LC-2) are partially degraded by contact with silica gel.

Comparative Example 4

As in Example 6, 100 g of a composition (hereinafter referred to as a "composition (LC-2)") represented by the formula (LC-2) was prepared, and as a result of measurement of purity, 0.022% of impurities other than the constituent components of the composition (LC-2) were detected. Then, 1 g of silica gel was added to 100 g of the composition (LC-2), followed by stirring for 1 hour. The silica gel was removed by filtration and measurement of purity of the resultant composition showed 0.025% of impurities other than the constituent components of the composition (LC-2). Also, the resultant composition had a resistivity value of $4.6 \times 10^{11}$ Ω·m. Further, a liquid crystal display device manufactured using the resultant composition exhibited good characteristics without causing display defects.

The above results revealed that in the purification method of this comparative example, the purity of the composition is decreased by contact with silica gel, and the resistivity value of the composition is also unsatisfactory. It is considered that the compounds constituting the composition represented by the formula (LC-2) are partially degraded by contact with silica gel.

INDUSTRIAL APPLICABILITY

The present invention can be used as, for example, a method for producing a compound constituting a liquid crystal material.

The invention claimed is:
1. A method for producing a composition, the method comprising:
preparing a raw material composition containing one or two or more compounds selected from a compound group represented by general formula (I),

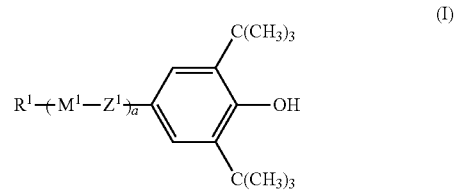

(in the general formula (I), $R^1$ represents a linear alkyl group or branched alkyl group having 1 to 22 carbon atoms, one or two or more —$CH_2$— in the alkyl group may be substituted by —O—, —CH=CH—, —CO—, —OCO—, —COO—, —C≡C—, —$CF_2O$—, or —$OCF_2$— so that oxygen atoms are not directly adjacent to each other,
a represents 0, 1, or 2,
$M^1$ represents a group selected from the group consisting of
(a) a trans-1,4-cyclohexylene group (one —$CH_2$— or two or more nonadjacent —$CH_2$— present in the group may be substituted by —O— or —S—), (b) a 1,4-phenylene group (one —CH═ or two or more nonadjacent —CH═ present in the group may be substituted by —N═), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chromane-2,6-diyl group, one or two or more hydrogen atoms contained in the group (a), group (b), or group (c) may be each substituted by a fluorine atom, a trifluoromethyl group, a trifluoromethoxy group, or a chlorine atom, and when a represents 2 and a plurality of $M^1$ are present, the plurality of $M^1$ present may be the same or different, $Z^1$ represents a single bond, —CH$_2$CH$_2$—, —CH═CH—, —C≡C—, —CH$_2$O—, —OCH$_2$—, —CF$_2$O—, —OCF$_2$—, —COO—, or —OCO—, and when a represents 2 and a plurality of $Z^1$ are present, the plurality of $Z^1$ present may be the same or different) and general formula (III),

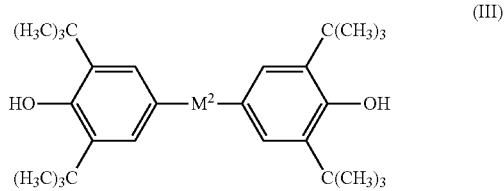

(in the general formula (III), $M^2$ represents an alkylene group having 1 to 15 carbon atoms (one or two or more —CH$_2$— in the alkylene group may be substituted by —O—, —CO—, —COO—, —OCO—, —CF$_2$O—, —OCF$_2$—, —CF$_2$—, —CH═CH—, —C≡C—, a 1,4-phenylene group (one or two or more hydrogen atoms in the 1,4-phenylene group may be substituted by a fluorine atom), or a trans-1,4-cyclohexylene group so that oxygen atoms are not directly adjacent to each other) or a single bond), the raw material composition further containing one or two or more compounds selected from a compound group represented by general formula (II),

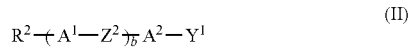

(in the general formula (II), $R^2$ represents an alkyl group having 1 to 8 carbon atoms, an alkenyl group having 2 to 8 carbon atoms, an alkoxy group having 1 to 8 carbon atoms, or an alkenyloxy group having 2 to 8 carbon atoms, b represents 1, 2, 3, or 4, $A^1$ and $A^2$ each independently represent a group selected from the group consisting of (a) a trans-1,4-cyclohexylene group (one —CH$_2$— or two or more nonadjacent —CH$_2$— present in the group may be substituted by —O— or —S—), (b) a 1,4-phenylene group (one —CH═ or two or more nonadjacent —CH═ present in the group may be substituted by —N═), and (c) a 1,4-bicyclo(2.2.2)octylene group, a naphthalene-2,6-diyl group, a decahydronaphthalene-2,6-diyl group, a 1,2,3,4-tetrahydronaphthalene-2,6-diyl group, or a chromane-2,6-diyl group, one or two or more hydrogen atoms contained in the group (a), group (b), or group (c) may be each substituted by a fluorine atom, a trifluoromethyl group, a trifluoromethoxy group, or a chlorine atom, and when b represents 2, 3, or 4 and a plurality of $A^1$ are present, the plurality of $A^1$ present may be the same or different, $Z^2$ represents a single bond, —CH$_2$CH$_2$—, —CH═CH—, —C≡C—, —CH$_2$O—, —OCH$_2$—, —CF$_2$O—, —OCF$_2$—, —COO—, or —OCO—, and when b represents 2, 3, or 4 and a plurality of $Z^2$ are present, the plurality of $Z^2$ present may be the same or different, and $Y^1$ represents a hydrogen atom, a fluorine atom, a chlorine atom, a trifluoromethyl group, a trifluoromethoxy group, an alkyl group having 1 to 6 carbon atoms, an alkenyl group having 2 to 6 carbon atoms, an alkoxy group having 1 to 6 carbon atoms, or an alkenyloxy group having 2 to 6 carbon atoms);

bringing the raw material composition into contact with a purifying agent composed of one or a mixture of silica gel, alumina, and an ion exchange resin after dissolving the raw material composition in an organic solvent or without adding an organic solvent to the raw material composition, and then removing the purifying agent; and when a composition after the purifying agent is removed does not contain the organic solvent, providing the composition as a target composition, and when the composition after the purifying agent is removed contains the organic solvent, distilling off the organic solvent to provide a target composition.

2. The method for producing a composition according to claim 1, wherein the raw material composition and the target composition contain at least one compound in which in the general formula (I), $R^1$ represents a linear alkyl group or branched alkyl group having 1 to 11 carbon atoms, $M^1$ represents a trans-1,4-cyclohexylene group or a 1,4-phenylene group, $Z^1$ represents a single bond, and a represents 0 or 1.

3. The method for producing a composition according to claim 1, wherein the raw material composition and the target composition contain at least one compound in which in the general formula (III), $M^2$ represents an alkylene group having 1 to 15 carbon atoms.

4. The method for producing a composition according to claim 1, wherein a total content of a compound represented by the general formula (I) and a compound represented by the general formula (III) is 0.001% by mass to 10% by mass relative to the mass of the raw material composition.

5. The method for producing a composition according to claim 1, wherein the raw material composition and the target composition contain at least one compound in which at least one of $A^1$ and $A^2$ in the general formula (II) represents any one selected from the following.

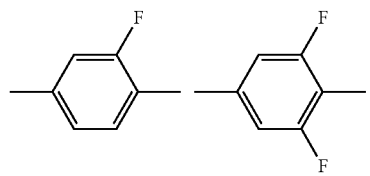

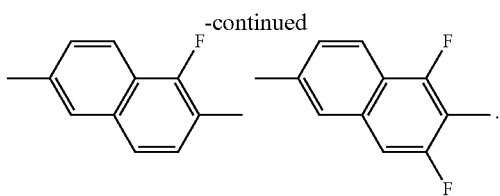

6. The method for producing a composition according to claim 5, wherein the raw material composition and the target composition contain at least one compound in which $Y^1$ in the general formula (II) represents a fluorine atom.

7. The method for producing a composition according to claim 5, wherein the raw material composition and the target composition contain at least one compound in which in the general formula (II), $R^2$ represents a methyl group, an ethyl group, a propyl group, a butyl group, or a pentyl group, and $Z^1$ represents a single bond, —CH$_2$CH$_2$—, —CF$_2$O—, or —OCF$_2$—.

8. The method for producing a composition according to claim 1, wherein the raw material composition and the target composition contain at least one compound in which at least one of $A^1$ and $A^2$ in the general formula (II) represents any one selected from the following

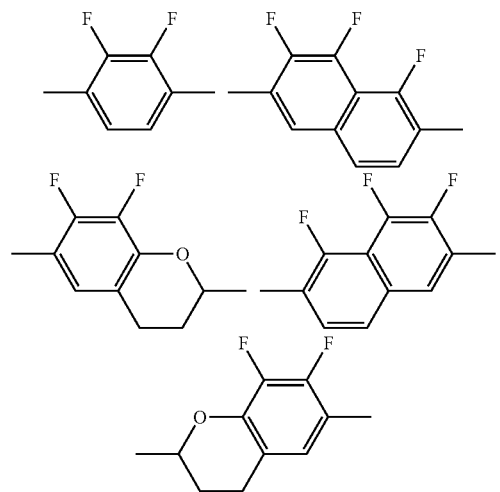

[Chem. 6]

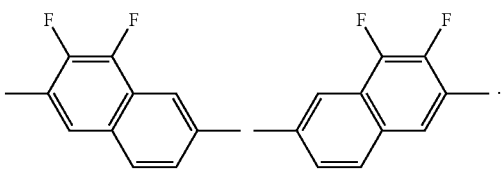

9. The method for producing a composition according to claim 8, wherein the raw material composition and the target composition contain at least one compound in which $R^2$ and $Y^1$ in the general formula (II) each independently represent a methyl group, an ethyl group, a propyl group, a butyl group, a pentyl group, a vinyl group, a methoxy group, an ethoxy group, a propoxy group, a butoxy group, a pentoxy group, a 3-butenyloxy group, or a 4-pentenyloxy group, and $Z^1$ represents a single bond, —CH$_2$CH$_2$—, —CH$_2$O—, —OCH$_2$—, —CF$_2$O—, or —OCF$_2$—.

10. The method for producing a composition according to claim 8, wherein the raw material composition and the target composition contain at least one compound in which at least one of $A^1$ and $A^2$ in the general formula (II) represents the following.

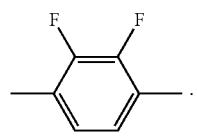

11. The method for producing a composition according to claim 1, wherein the raw material composition and the target composition contain at least one compound in which $R^2$ and $Y^1$ in the general formula (II) each independently represent an alkyl group having 1 to 6 carbon atoms, an alkenyl group having 2 to 6 carbon atoms, an alkoxy group having 1 to 6 carbon atoms, or an alkenyloxy group having 2 to 6 carbon atoms, $A^1$ and $A^2$ each independently represent a trans-1,4-cyclohexylene group or a 1,4-phenylene group, and $Z^2$ represents a single bond or —CH$_2$CH$_2$—.

12. A composition produced by the method for producing a composition according to claim 1.

13. The method for producing a composition according to claim 1, wherein the raw material composition and the target composition further contain one or two or more compounds selected from a compound group represented by general formula (IV),

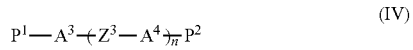

(in the general formula (IV), $P^1$ and $P^2$ each independently represent an acryloyloxy group, a methacryloyloxy group, a vinyl group, a vinyloxy group, or a group represented by any one of formulae (Ep-1) to (Ep-7) below,

 (Ep-1)

 (Ep-2)

 (Ep-3)

 (Ep-4)

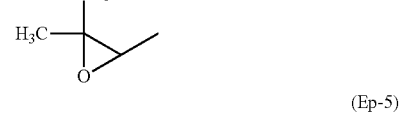 (Ep-5)

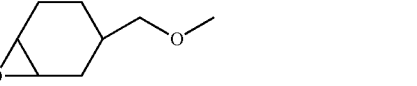 (Ep-6)

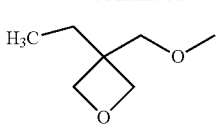

(Ep-7)

n represents 0, 1, or 2,

A³ and A⁴ each independently represent a 1,4-phenylene group or a naphthalene-2,6-diyl group (one or two or more hydrogen atoms contained in the groups may be each substituted by a fluorine atom), and when n represents 2 and a plurality of A⁴ are present, the plurality of A⁴ present may be the same or different, and Z³ represents —COO—, —OCO—, —CH$_2$CH$_2$COO—, —OCOCH$_2$CH$_2$—, —CH$_2$CH$_2$OCO—, —COOCH$_2$CH$_2$—, —(CH$_2$)$_4$—, —(CH$_2$)$_3$O—, —O(CH$_2$)$_3$—, —CH$_2$CH$_2$OCH$_2$—, —CH$_2$OCH$_2$CH$_2$—, or a single bond, and when n represents 2 and a plurality of Z³ are present, the plurality of Z³ present may be the same or different).

14. The method for producing a composition according to claim 13, wherein the raw material composition and the target composition contain at least one compound in which in the general formula (IV), P¹ and P² each independently represent an acryloyloxy group or a methacryloyloxy group, and A³ and A⁴ each independently represent a 1,4-phenylene group (hydrogen atoms contained in the group may be each substituted by a fluorine atom).

15. The method for producing a composition according to claim 1, wherein the raw material composition and the target composition contain at least one compound in which R² in the general formula (II) is an alkenyl group having 2 to 6 carbon atoms.

16. The method for producing a composition according to claim 1, wherein one or a mixture of silica gel and alumina is used as the purifying agent.

17. The method for producing a composition according to claim 1, wherein the amount of the purifying agent used is 0.1 parts by mass to 1000 parts by mass relative to 100 parts by mass of the raw material composition.

18. The method for producing a composition according to claim 1, wherein the organic solvent is a single solvent selected from hexane and structural isomers thereof, heptane and structural isomers thereof, octane and structural isomers thereof, petroleum ether, benzene, toluene, xylene, and cumene, or a mixed solvent containing one or two or more of these solvents.

* * * * *